US008353094B2

(12) United States Patent
Parker

(10) Patent No.: US 8,353,094 B2
(45) Date of Patent: Jan. 15, 2013

(54) METHOD OF FORMING SHEET METAL CASKET

(75) Inventor: Daniel J. Parker, Connersville, IN (US)

(73) Assignee: Batesville Services, Inc., Batesville, IN (US)

( * ) Notice: Subject to any disclaimer, the term of this patent is extended or adjusted under 35 U.S.C. 154(b) by 339 days.

(21) Appl. No.: 12/763,457

(22) Filed: Apr. 20, 2010

(65) Prior Publication Data

US 2010/0199482 A1 Aug. 12, 2010

Related U.S. Application Data

(62) Division of application No. 12/240,465, filed on Sep. 29, 2008, now Pat. No. 7,698,792.

(51) Int. Cl.
*B21D 39/03* (2006.01)
*B23P 11/00* (2006.01)

(52) U.S. Cl. .............. 29/525.14; 72/379.4; 27/6; 27/10; 29/525.01

(58) Field of Classification Search .................... 27/2, 4, 27/6, 10; 29/428, 525.01, 525.14; 72/379.2, 72/379.4
See application file for complete search history.

(56) References Cited

U.S. PATENT DOCUMENTS

| | | | | |
|---|---|---|---|---|
| 801,264 | A | 10/1905 | Post | |
| 2,056,419 | A * | 10/1936 | Cohen | 27/35 |
| 2,213,506 | A | 9/1940 | Thoresen | |
| 2,836,876 | A | 6/1958 | Ziegler | |
| RE25,525 | E | 2/1964 | Harrell | |
| 4,195,394 | A | 4/1980 | Semon | |
| 4,304,031 | A * | 12/1981 | Semon et al. | 27/10 |
| 4,571,790 | A | 2/1986 | James, III | |
| 5,813,100 | A | 9/1998 | Mackirdy | |
| 5,822,843 | A * | 10/1998 | Diekhoff et al. | 29/512 |
| 5,875,529 | A | 3/1999 | Ollier | |
| 6,138,335 | A | 10/2000 | Drawbaugh et al. | |
| 6,301,758 | B1 * | 10/2001 | Biondo et al. | 27/12 |
| 6,317,945 | B1 | 11/2001 | Laphan et al. | |
| 6,543,103 | B1 | 4/2003 | Robert | |
| 6,557,222 | B2 | 5/2003 | Groemminger et al. | |
| 6,591,466 | B1 * | 7/2003 | Acton et al. | 27/10 |
| 6,691,385 | B2 | 2/2004 | DiBease et al. | |
| 6,745,442 | B2 | 6/2004 | Biondo et al. | |
| 6,928,706 | B2 * | 8/2005 | Acton et al. | 27/10 |
| 7,200,905 | B2 | 4/2007 | Cunningham et al. | |
| 7,260,872 | B2 | 8/2007 | Schultz | |
| 7,340,810 | B2 * | 3/2008 | Acton et al. | 27/10 |

(Continued)

OTHER PUBLICATIONS 2 drawing sheets of a casket corner ornament attachment clip in public use or on sale in the United States greater than one year prior to Sep. 29, 2008.
Notice of Allowance, U.S. Appl. No. 12/240,598, 12 pages, Aug. 2, 2010.
Notice of Allowance, U.S. Appl. No. 12/240,647, 14 pages, Aug. 3, 2010.

*Primary Examiner* — David Bryant
*Assistant Examiner* — Christopher Koehler
(74) *Attorney, Agent, or Firm* — Wood, Herron & Evans, LLP

(57) ABSTRACT

A method of forming a sheet metal casket comprises providing a sheet metal casket shell having at least a portion of an end wall and at least a portion of a side wall and a round corner between the portion of the end wall and the portion of the side wall, and forming a generally planar corner oriented at about a 45° angle relative to the portion of the end wall and the portion of the side wall.

22 Claims, 5 Drawing Sheets

U.S. PATENT DOCUMENTS

| | | | | |
|---|---|---|---|---|
| 7,343,653 | B2 | 3/2008 | Cunningham et al. | |
| 7,448,117 | B1 | 11/2008 | Sauder et al. | |
| 2003/0192155 | A1 * | 10/2003 | Acton et al. | 27/10 |
| 2005/0076485 | A1 * | 4/2005 | Schultz | 27/10 |
| 2005/0268441 | A1 * | 12/2005 | Acton et al. | 27/10 |
| 2010/0077577 | A1 | 4/2010 | Rojdev | |
| 2010/0077578 | A1 | 4/2010 | Motz et al. | |
| 2010/0077580 | A1 | 4/2010 | Holzman | |

* cited by examiner

METHOD OF FORMING SHEET METAL CASKET

RELATED APPLICATIONS

This application is a divisional of U.S. application Ser. No. 12/240,465 filed Sep. 29, 2008, now U.S. Pat. No. 7,698,792 issued Apr. 20, 2010, which is hereby incorporated by reference herein.

FIELD

This relates generally to caskets, and more particularly to sheet metal caskets.

BACKGROUND

There is a trend in the death care industry towards personalizing to the deceased the funeral products and the funeral or other memorial service to provide a more meaningful memorial experience for the family and friends of the deceased. The casket in which the deceased is displayed can be customized to fit the needs and preferences of the deceased and the family. For instance, a wide variety of materials, finishes, colors, and decorative ornamentation can be chosen for the casket.

Some casket designs incorporate decorative corner ornaments secured to the casket during fabrication thereof. In many, if not most, prior designs, these ornamental corner pieces are rigidly affixed to the casket shell. Consequently, if a customer purchasing the casket is not pleased with the particular pre-installed ornamental corner pieces, and wishes to customize the casket exterior to his or her taste, the funeral director must go through a lengthy and complicated process to first remove the original ornamental corner pieces and then reinstall the ornamental corner pieces chosen by the customer. This process typically requires manual manipulation and access to the interior of the casket which may require the removal of bedding, lining, and the like. Such a process is time consuming and can damage the otherwise new casket and is thus frowned upon and generally avoided by the funeral director.

To more effectively market caskets, the funeral director desires to offer a wide variety of ornamental corner pieces from which a customer can select according to the customer's taste. However, to offer such a wide selection, and to avoid the undesirable practice mentioned above, the funeral director would have to maintain a large inventory of many different casket material/finish and corner piece combinations, which is also undesirable. To minimize the required inventory of finished caskets, the funeral director could simply have one casket of each material/finish on hand provided that the funeral director had some means providing for the quick and efficient changing of the ornamental corner pieces on each casket. As such, the customer could quickly view numerous corner pieces on a single casket, and the funeral director would need only stock a single casket of each material finish. Many prior casket designs, which rigidly affix the ornamental corner pieces, do not permit such quick and efficient changing of the ornamental corner pieces as discussed above.

A quick-change casket corner mechanism is disclosed in Acton et al. U.S. Pat. Nos. 6,591,466, 5,928,706, and 7,340,810, assigned to the assignee of the present invention and incorporated by reference herein. The Acton et al. patents disclose an ornamental corner piece assembly having a back plate that attaches to the corner of a casket. The back plate includes a clip member having at least one keyhole groove. A decorative corner insert includes at least one attachment member that slidingly engages the keyhole groove in the clip member such that the corner insert removably couples to the back plate. In this way, a funeral director may quickly and conveniently change out the decorative corner pieces to provide a wide variety of casket designs personalized to the deceased. Such a quick change casket corner ornament is commercially available from the assignee as its LIFESYMBOLS® line of corner ornaments.

Sheet metal caskets having round corners present their own unique challenges to incorporating the quick change casket corner of the Acton et al. patents. More particularly, it is desirable to orient the casket corner ornament at about a 45° angle relative to the adjacent casket shell side wall and end wall between which the casket corner ornament is positioned. Round corner sheet metal caskets have heretofore thus been problematic and therefore the casket corner ornament of the type disclosed in the Acton et al. patents has not previously been utilized on round corner sheet metal casket shells. For sheet metal casket shells having right-angle corners, currently a rectangular cut out is formed and then a flat rectangular plate is welded over the rectangular opening formed in the casket shell corner. A flat 45° wall between adjacent casket shell side and end walls is thus formed on which the casket corner back plate of the Acton et al. patents may be mounted.

It is desirable to devise a method of mounting the quick change casket corner ornament of the Acton et al. patents to a sheet metal casket having round corners which is less labor intensive than the method of mounting the quick change casket corner ornament of the Acton et al. patents to a sheet metal casket having right-angle corners.

SUMMARY

In one aspect, a method of forming a sheet metal casket comprises providing a sheet metal casket shell having at least a portion of an end wall and at least a portion of a side wall and a round corner between the portion of the end wall and the portion of the side wall, and forming a generally planar corner oriented at about a 45° angle relative to the portion of the end wall and the portion of the side wall.

The step of forming a generally planar corner can comprise deforming the round corner inwardly so that the prior round corner becomes generally planar and oriented at about a 45° angle relative to the portion of the end wall and the portion of the side wall. The method can further comprise attaching a corner ornament back plate to the planar casket shell corner. The method can further comprise attaching an attachment clip to the back plate, the attachment clip having at least one groove comprising a slot and an opening communicating with the slot. The method can further comprise attaching an attachment clip to the back plate, the attachment clip having at least one groove comprising a first keyhole portion and a second non-keyhole portion. The first keyhole portion can have a first longitudinal axis, the second non-keyhole portion can have a second longitudinal axis, and the first and second longitudinal axes can be non-parallel. The first and second longitudinal axes can be perpendicular. The method can further comprise attaching an attachment clip to the back plate, the attachment clip configured such that a corner ornament is removably secured to the back plate via motion in first and second non-parallel directions generally parallel to a plane defined by a mounting surface of the back plate. The motion in the first and second directions can be rectilinear.

In another aspect, a sheet metal casket comprises a sheet metal casket shell having a pair of side walls and a pair of end walls and a generally planar corner spanning respective ends of adjacent ones of the side and end walls, the generally planar corner oriented at about a 45° angle relative to the adjacent ones of the side and end walls, the generally planar corner, at least a portion of the adjacent end wall, and at least a portion of the adjacent side wall formed from a continuous single piece of sheet metal.

The casket can further comprise a corner ornament back plate attached to the planar casket shell corner. The casket can further comprise an attachment clip attached to the back plate, the attachment clip having at least one groove comprising a slot and an opening communicating with the slot. The casket can further comprise an attachment clip attached to the back plate, the attachment clip having at least one groove comprising a first keyhole portion and a second non-keyhole portion. The first keyhole portion can have a first longitudinal axis, the second non-keyhole portion can have a second longitudinal axis, and the first and second longitudinal axes can be non-parallel. The first and second longitudinal axes can be perpendicular. The casket can further comprise an attachment clip attached to the back plate, the attachment clip configured such that a corner ornament is removably secured to the back plate via motion in first and second non-parallel directions generally parallel to a plane defined by a mounting surface of the back plate. The motion in said first and second directions is can be rectilinear.

In another aspect a sheet metal casket comprises a sheet metal casket shell having a pair of side walls and a pair of end walls and a generally planar corner spanning respective ends of adjacent ones of the side and end walls, the generally planar corner oriented at about a 45° angle relative to the adjacent ones of the side and end walls, the generally planar corner, at least a portion of the adjacent end wall, and at least a portion of the adjacent side wall formed from a continuous single piece of sheet metal, a corner ornament back plate attached to the planar casket shell corner, an attachment clip attached to the back plate, the attachment clip having at least one groove comprising a slot and an opening communicating with the slot, and an ornament with a fastener attached thereto, the fastener having a head thereon, the ornament attached to the back plate, the head removably retained behind the slot.

The attachment clip can comprise a front portion having a pair of vertically spaced right angle keyhole grooves therethrough, having a rearwardly projecting circular post, and having a rectangular rib adjacent said post, and a back portion having a pair of vertically spaced spring tabs each of which cooperates with one of the pair of vertically spaced right angle keyhole grooves, having a circular hole for receiving the circular post, and having a rectangular hole for receiving the rectangular rib. The ornament can include a pair of vertically spaced fasteners on a rear side thereof, each of which includes a head thereon. Each spring tab can include a pair of ribs spaced apart to accept the head of a respective one of the pair of fasteners.

DRAWINGS

DESCRIPTION

Figure 1:
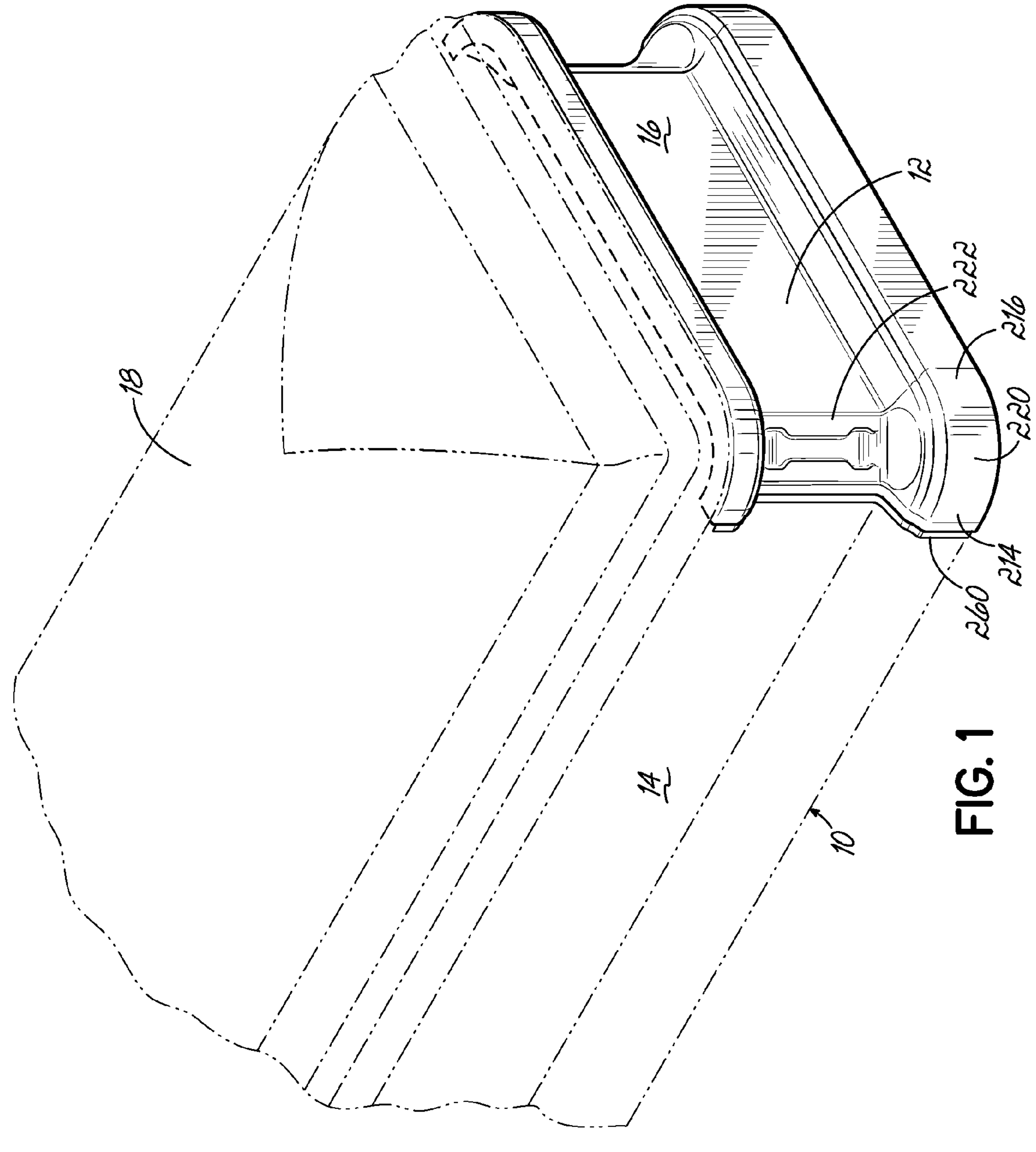
FIG. 1 is a partial perspective view of a sheet metal casket.
Figure 2C:
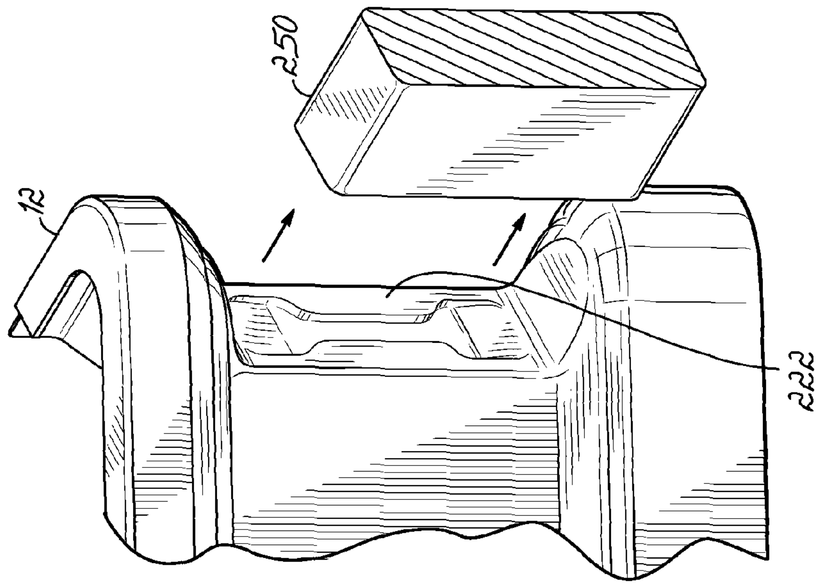
FIGS. 2A-2C are diagrammatic partial perspective views of the process of forming the sheet metal casket of FIG. 1.
Figure 2B:
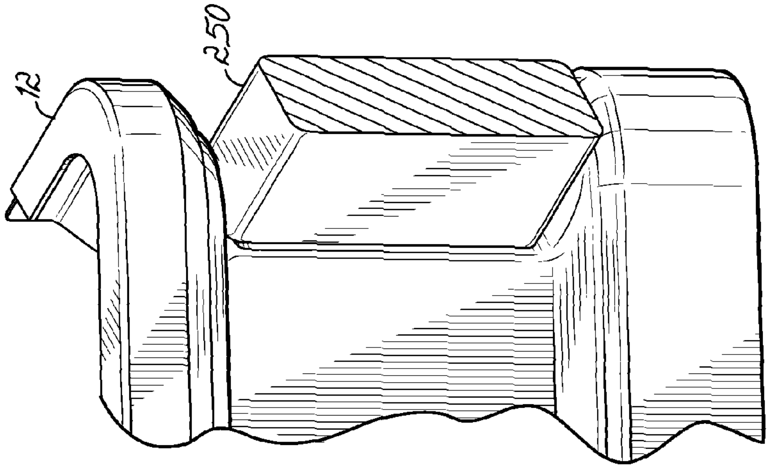
Figure 2A:
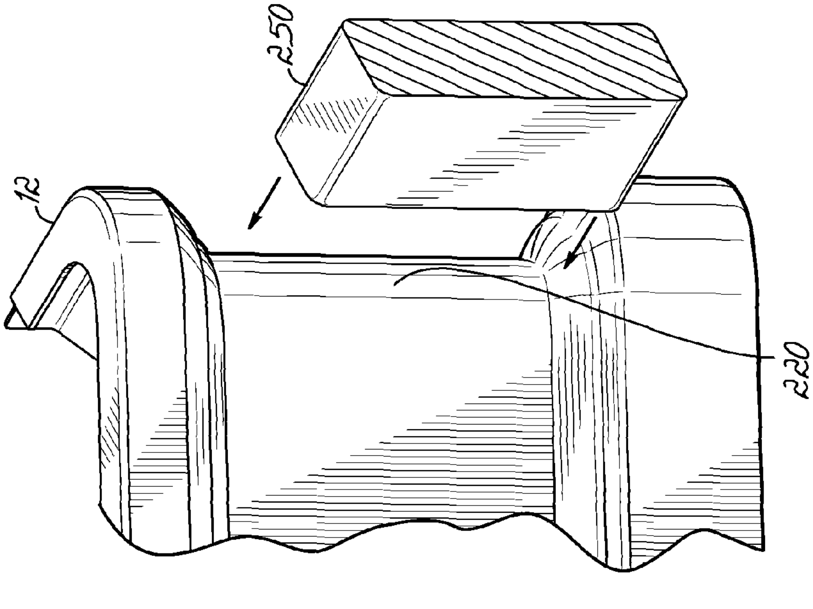
Figure 3:
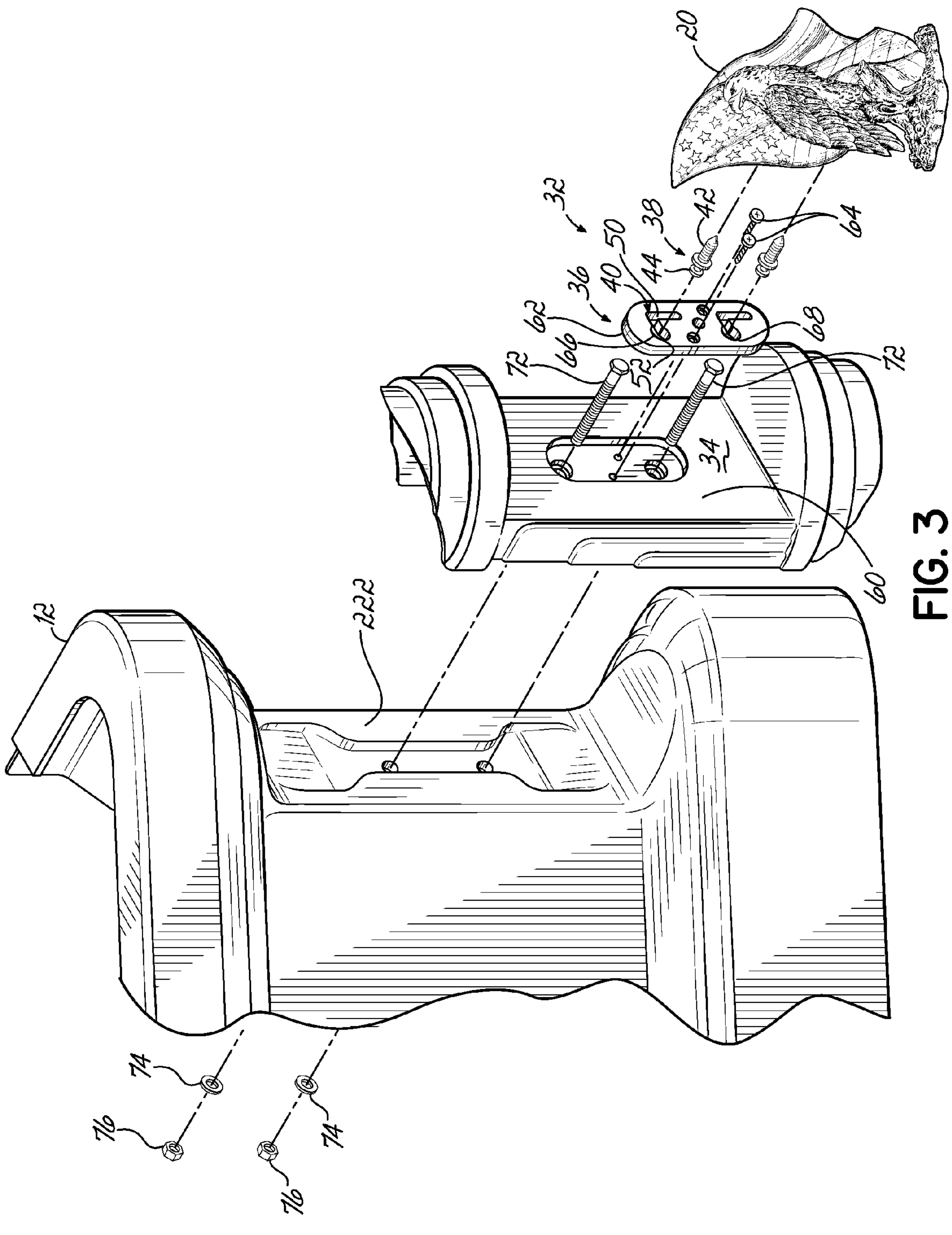
FIG. 3 is an exploded partial perspective view of the casket of FIGS. 1 and 2 with back plate, attachment clip, and ornament.
Figure 4:
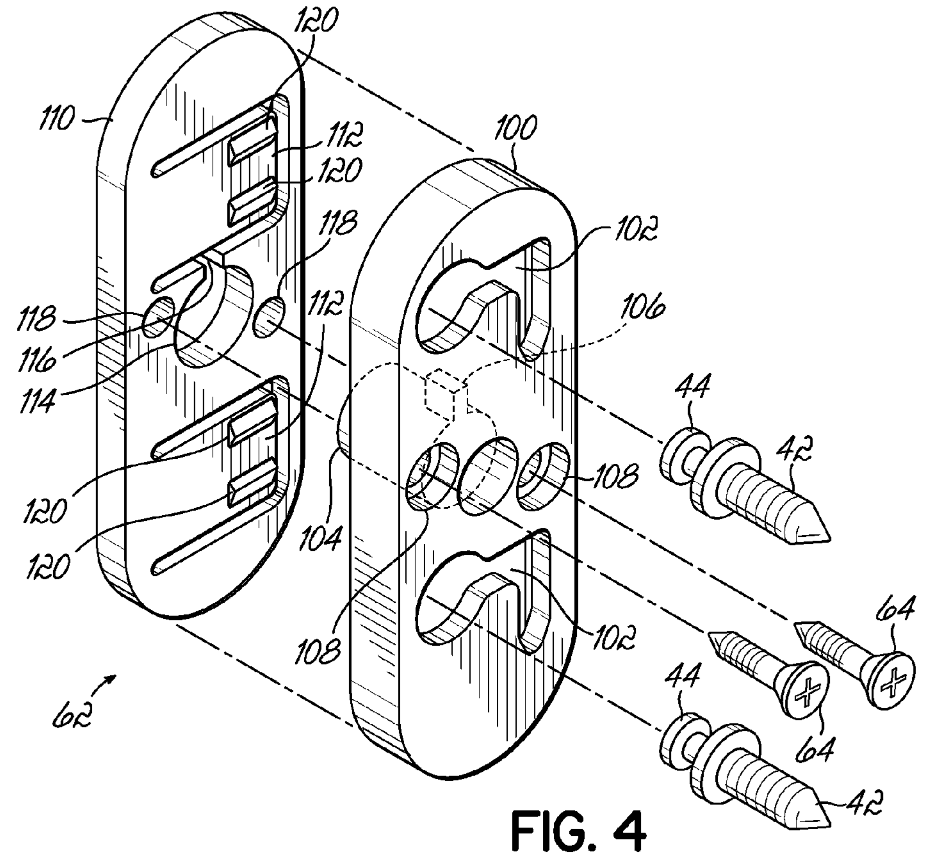
FIG. 4 is an exploded perspective view of an attachment clip for attaching the ornament to the casket.
Figure 5:
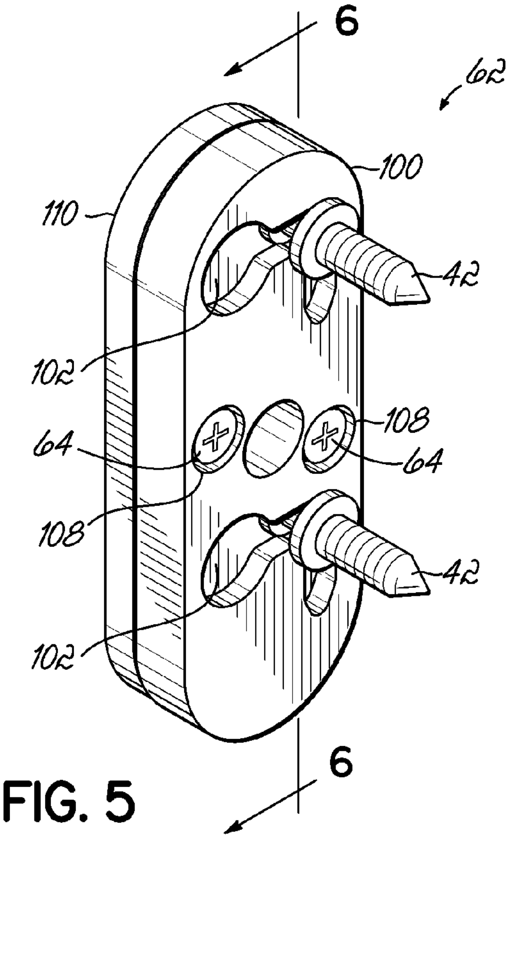
FIG. 5 is an assembled perspective view of the attachment clip of FIG. 4.
Figure 6A:
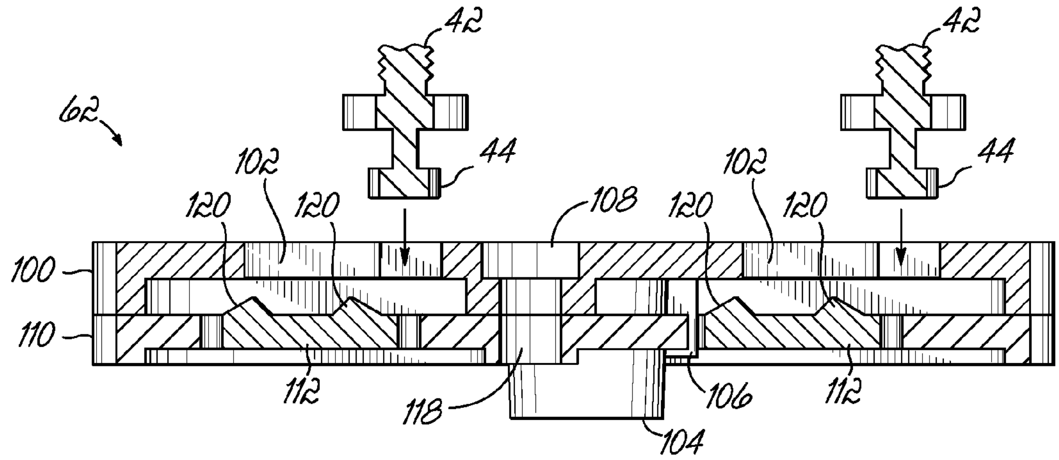
FIG. 6A is a view taken along line 6-6 in FIG. 5 showing the ornament and its fastener prior to attachment to the attachment clip.
Figure 6B:
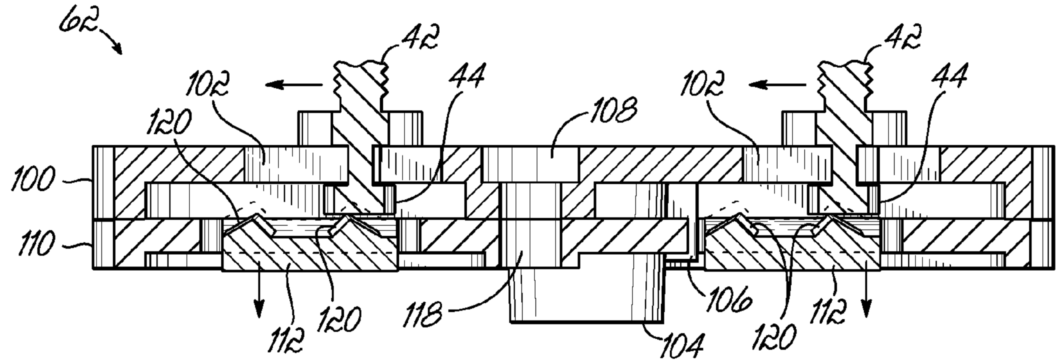
FIG. 6B is a view similar to FIG. 6A showing the ornament fastener head inserted into the attachment clip.
Figure 6C:
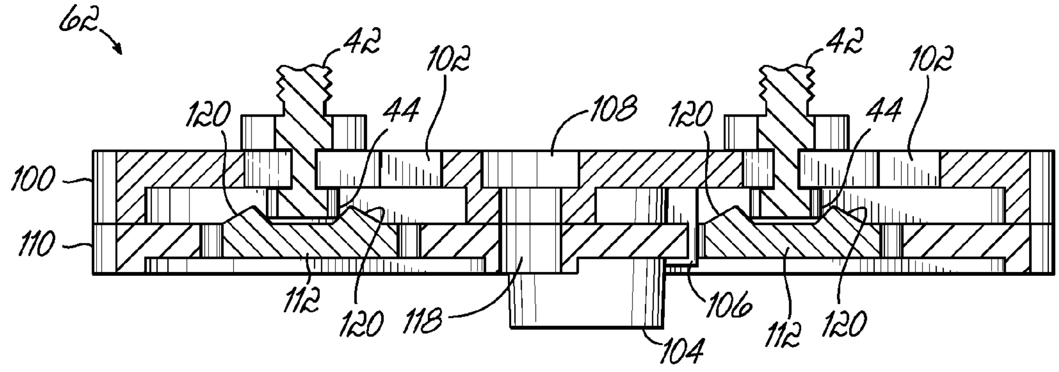
FIG. 6C is a view similar to FIG. 6B showing the ornament fastener head slid into its final position in the attachment clip and coming to rest between the two ribs on the spring tab.

Referring to FIGS. 1 and 3, a casket 10 comprises a casket shell 12 having a pair of side walls 14 and a pair of end walls 16, a casket lid 18 closable on the casket shell 12, and an ornament 20, for example a corner ornament, mounted to the shell 12. The casket shell 12 and ornament 20 are configured such that the ornament 20 is removably attachable to the casket shell 12.

The casket 10 and ornament 20 can further comprise apparatus 32 for removably securing the ornament 20 to a mounting surface 34 of the shell 12. That apparatus 32 can comprise a first attachment element 36 associated with the mounting surface 34 of the shell 12 and a second attachment element 38 associated with the ornament 20. The first 36 and second 38 attachment elements are for removably securing the ornament 20 to the shell 12. One of the first 36 and second 38 attachment elements can be at least one groove 40 and the other of the first 36 and second 38 attachment elements can be at least one fastener 42 having a head 44 thereon. The groove 40 can comprise a slot 50 and an opening 52 communicating with the slot 50, the opening 52 being of a greater dimension than the slot 50. The fastener 42 can be a threaded fastener, for example a screw. The screw can be for example a shoulder screw.

The shell 12 can have a mounting member 60 disposed between adjacent ones of the side 14 and end 16 walls, and the ornament 20 can be mounted to the mounting member 60. Accordingly in this example the mounting surface 34 is a part of the mounting member 60 of the shell 12. Mounting member 60 can be the back plate shown and described in the Acton et al. patents. It can be attached to the shell with the use of bolts, nuts, and washers 72, 74, 76, respectively, or other suitable attachment means. Other mounting surfaces and members are possible. The mounting member 60 can be oriented at a 45° angle relative to the adjacent ones of the side 14 and end 16 walls. The first attachment element 36 can be associated with the mounting member 60, and the second attachment element 38 can be associated with the ornament 20. For example, groove 40, or a pair of grooves 40, can be formed in an attachment clip 62 secured to mounting member 60 with screws 64, and the shoulder screws 42 can be secured to the rear side of the ornament 20.

The first 36 and second 38 attachment elements can be configured such that the ornament 20 is removably secured to the shell 12 via motion in first and second non-parallel directions generally parallel to a plane defined by the mounting member 60. The groove(s) 40 can include a first keyhole portion 66 and a second non-keyhole portion 68. The first keyhole portion 66 can have a first longitudinal axis, the second non-keyhole portion 68 can have a second longitudinal axis, and the first and second longitudinal axes can be non-parallel. For example, the first and second longitudinal axes can be perpendicular. For examples, the first and second directions can be rectilinear or curvilinear.

To install the ornament 20, the head(s) 44 of the fastener(s) 42 are inserted into opening(s) 52 of groove(s) 40; ornament 20 is then moved generally parallel to a plane defined by mounting member 60 from left to right as illustrated thus sliding head(s) 44 from left to right in slot(s) 40. The ornament 20 is then moved again generally parallel to the plane defined by the mounting member 60 downwardly thus sliding head(s) 44 down in slot(s) 50. While not required, the multi-direction movement to install ornament 20 can reduce the potential for the ornament 20 to become inadvertently dislodged.

Referring to FIGS. 4-6C, one form of attachment clip 62 which could be used is illustrated. The attachment clip 62 can have a front portion 100 having a pair of vertically spaced right angle keyhole grooves 102 therethrough, a rearwardly projecting circular post 104, and a rectangular rib 106 adjacent the post 104. The attachment clip 62 can have a back portion 110 having a pair of vertically spaced spring tabs 112 each of which cooperates with one of the pair of vertically spaced right angle keyhole grooves 102, a circular hole 114 for receiving the circular post 104, and a rectangular hole 116 for receiving the rectangular rib 106. Post 104, rib 106, hole 114, and hole 116 are to properly orient the front portion 100 with the back portion 110. Both portions have holes 108, 118, respectively, for receiving screws 54, rivets, etc. Each spring tab 112 can include a pair of ribs 120 which are spaced apart to accept the head 34 of fastener 32. As seen in FIGS. 7A-7C, heads 34 are inserted into keyhole grooves 102, slid to the right, and then slid down. Sliding the heads 34 down causes the spring tabs 112 to deflect rearwardly as heads 34 travel down and over the uppermost ones of the pairs of ribs 112. Once over the uppermost ones of the pairs of ribs 112, spring tabs spring forwardly retaining heads 34 between ribs 112 and against a rear surface of keyhole grooves 102.

Referring to FIGS. 1 and 2A-C, a method of forming the sheet metal casket shell 12 is illustrated. The method comprises providing a sheet metal casket shell 12 having at least a portion 216 of the end wall 16 and at least a portion 214 of the side wall 14 and a round corner 220 between the portion 216 of the end wall 16 and the portion 214 of the side wall 14, and forming a generally planar corner 222 oriented at about a 45° angle relative to the portion 216 of the end wall 16 and the portion 214 of the side wall 14. One way to form the generally planar corner 222 is to deform the round corner 220 inwardly by, for example, a tool or die 250 so that the prior round corner 220 becomes generally planar and oriented at about a 45° angle relative to the portion 216 of the end wall 16 and the portion 214 of the side wall 14. All other ways of forming a generally planar corner 222 are also deemed to be embraced by the claims. Once so formed, the mounting member or back plate 60 can be attached to the generally planar corner 222. One way to form the sheet metal casket shell 12 is to form two single continuous sheets of sheet metal into two complete end assemblies each having an end wall 16, two round corners 220 and two short sections of side wall 214 extending from the round corners 220 towards one another. Then, a side wall panel 260 can be welded to the two short sections of side wall 214 extending towards one another, on both sides of the end assemblies, to form the two long sections of the side walls 14. In this way the shell is fabricated from four components. Other fabrication techniques are of course possible and all other ways of fabricating the sheet metal casket shell are deemed to be embraced by the claims. For example, the shell could be fabricated from eight components: four round corners each with a short section of side wall and a short section of end wall, two side wall panels welded to the four corners, and two end wall panels welded to the four corners.

The embodiments shown and described are merely for illustrative purposes only. The drawings and the description are not intended to limit in any way the scope of the claims. Those skilled in the art will appreciate various changes, modifications, and other embodiments. All such changes, modifications and embodiments are deemed to be embraced by the claims. Accordingly, the scope of the right to exclude shall be limited only by the following claims and their equivalents.

What is claimed is:

1. A method of forming a sheet metal casket comprising:

providing a sheet metal casket shell having at least a portion of an end wall and at least a portion of a side wall and a round corner between the portion of the end wall and the portion of the side wall, and forming a generally planar corner oriented at about a 45° angle relative to the portion of the end wall and the portion of the side wall, wherein the step of forming a generally planar corner comprises deforming the round corner inwardly so that the prior round corner becomes generally planar and oriented at about a 45° angle relative to the portion of the end wall and the portion of the side wall.

2. The method of claim 1 further comprising attaching a corner ornament back plate to the planar casket shell corner.

3. The method of claim 2 further comprising attaching an attachment clip to the back plate, the attachment clip having at least one groove comprising a slot and an opening communicating with the slot.

4. The method of claim 2 wherein the back plate has at least one groove comprising a first keyhole portion and a second non-keyhole portion.

5. The method of claim 4 wherein the first keyhole portion has a first longitudinal axis, the second non-keyhole portion has a second longitudinal axis, and the first and second longitudinal axes are non-parallel.

6. The method of claim 5 wherein the first and second longitudinal axes are perpendicular.

7. The method of claim 2 wherein the back plate is configured such that a corner ornament is removably secured to the back plate via motion in first and second non-parallel directions generally parallel to a plane defined by a mounting surface of the back plate.

8. The method of claim 7 wherein the motion in the first and second directions is rectilinear.

9. The method of claim 1 wherein the step of deforming the round corner inwardly further comprises forming a first surface and a second surface recessed from the first surface.

10. The method of claim 9 wherein the step of forming the second surface further comprises forming a recessed area having an upper region, a lower region, and an intermediate region intermediate the upper and lower regions, the upper region having a first width, the lower region having a second width, and the intermediate region having a third width, the third width being less than the first and second widths, the first and second widths being about equal.

11. The method of claim 10 wherein the intermediate region connects with the upper region and with the lower region.

12. The method of claim 10 further comprising the step of forming fastener holes through the intermediate region of the recessed area to accommodate fasteners for attaching an ornament to the corner.

13. The method of claim 10 further comprising the step of attaching a backplate to the corner by passing fasteners through the backplate and through the holes in the recessed area.

14. The method of claim 10 further comprising removably attaching an ornament to the backplate with cooperating fasteners on the backplate and ornament.

15. The method of claim 1 wherein the step of deforming the round corner inwardly comprises contacting the round corner with an appropriately shaped tool and urging the round corner inwardly with the tool.

16. A method of forming a sheet metal casket comprising:

providing a pair of opposite sheet metal casket shell end wall assemblies, each assembly formed from a continuous seamless single piece of sheet metal, each assembly having an end wall, two curved corners, and two short side wall sections each of which extends from a respective one of the corners, providing a pair of sheet metal casket shell side wall panels, deforming each of the four corners of the pair of end wall assemblies to form a generally planar corner oriented at about a 45° angle relative to its respective end wall and short side wall section, and welding each of the pair of side wall panels to respective ones of the short side wall sections.

17. The method of claim 16 wherein the step of deforming the curved corner inwardly further comprises forming a first surface and a second surface recessed from the first surface.

18. The method of claim 17 wherein the step of forming the second surface further comprises forming a recessed area having an upper region, a lower region, and an intermediate region intermediate the upper and lower regions, the upper region having a first width, the lower region having a second width, and the intermediate region having a third width, the third width being less than the first and second widths, the first and second widths being about equal.

19. The method of claim 18 further comprising the step of forming fastener holes through the intermediate region of the recessed area to accommodate fasteners for attaching an ornament to the corner.

20. The method of claim 19 further comprising the step of attaching a backplate to the corner by passing fasteners through the backplate and the holes in the recessed area.

21. The method of claim 20 further comprising removably attaching an ornament to the backplate with cooperating fasteners on the backplate and ornament.

22. The method of claim 16 wherein the step of deforming the curved corner inwardly comprises contacting the curved corner with an appropriately shaped tool and urging the curved corner inwardly with the tool.

* * * * *

UNITED STATES PATENT AND TRADEMARK OFFICE

CERTIFICATE OF CORRECTION

PATENT NO. : 8,353,094 B2
APPLICATION NO. : 12/763457
DATED : January 15, 2013
INVENTOR(S) : Daniel J. Parker It is certified that error appears in the above-identified patent and that said Letters Patent is hereby corrected as shown below:

In the Claims

Column 6, line 53, Claim 12 reads: "12. The method of claim 10 further comprising the step of"; it should read: -- The method of claim 11 further comprising the step of --.

Column 6, line 57, Claim 13 reads: "13. The method of claim 10 further comprising the step of"; it should read: -- 13. The method of claim 12 further comprising the step of --.

Column 6, line 61, Claim 14 reads: "14. The method of claim 10 further comprising removably"; it should read: -- 14. The method of claim 13 further comprising removably --.

Signed and Sealed this
Seventh Day of April, 2015

Michelle K. Lee
*Director of the United States Patent and Trademark Office*